Aug. 7, 1945.    F. J. BURNHAM    2,381,104
STRAINER FILTER FOR COFFEE MAKING
Filed May 10, 1943
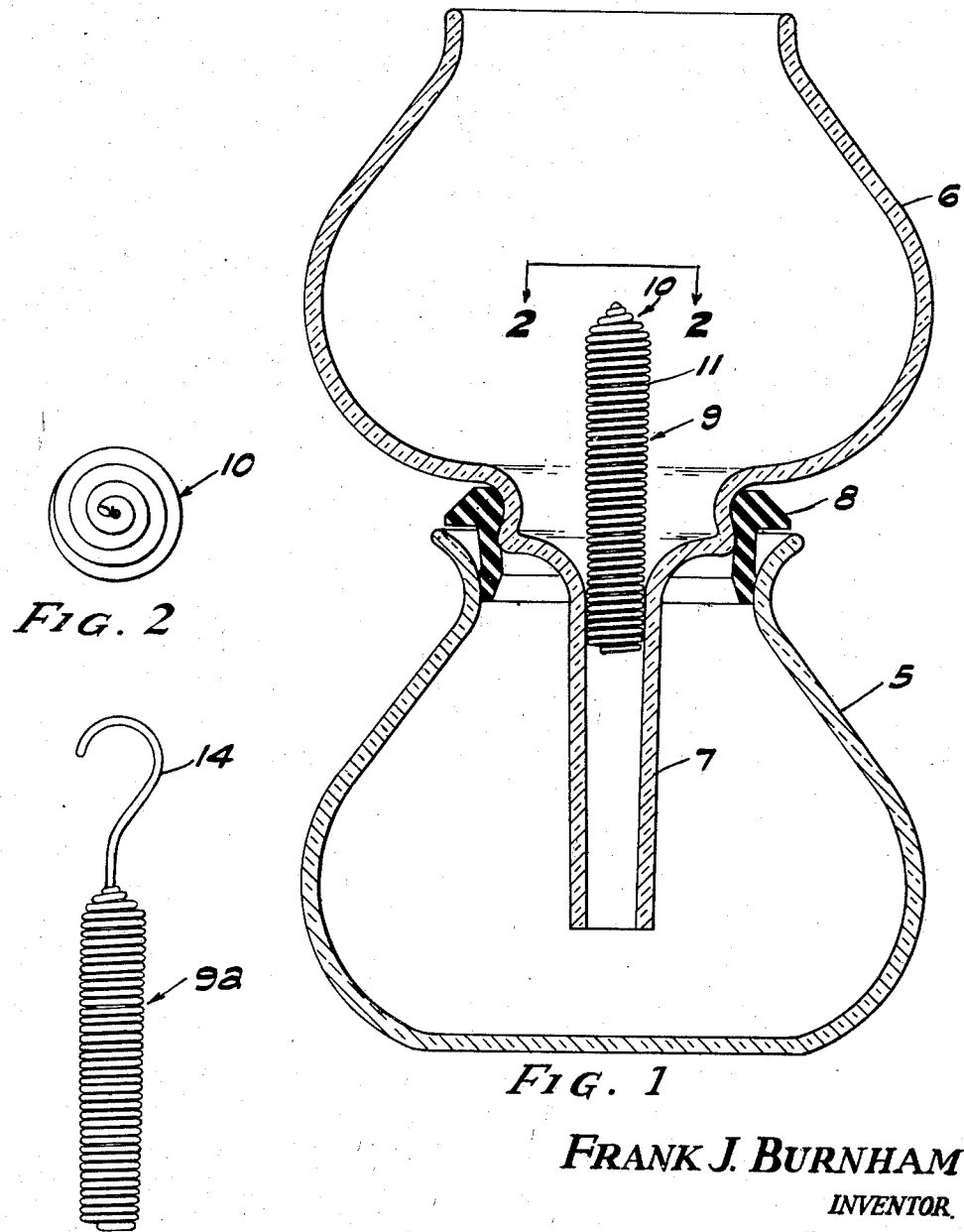
Fig. 2
Fig. 3
Fig. 1
FRANK J. BURNHAM, INVENTOR.
ATTORNEY.

Patented Aug. 7, 1945

2,381,104

UNITED STATES PATENT OFFICE 2,381,104

STRAINER FILTER FOR COFFEE MAKING

Frank J. Burnham, Los Angeles, Calif.

Application May 10, 1943, Serial No. 486,435

4 Claims. (Cl. 210—162)

This invention relates to a strainer filter for coffee making.

More specifically speaking the invention pertains to an improvement in coffee makers of the pressure-vacuum type in which are utilized communicating upper and lower receptacles, water being forced by heating, from the lower to the upper receptacle where it comes into contact with finely ground coffee to form liquid coffee by infusion, whence said liquid coffee is drawn down by vacuum (produced by cooling) into the lower receptacle.

The invention principally pertains to a new article of manufacture consisting of a coil of a resilient character, between adjacent convolutions of which a filtering slit is provided by proper tensioning of the coils.

The present invention further pertains to an improvement upon the strainer for coffee makers disclosed in United States Patent No. 2,225,027, issued to Thomas J. Anders December 17, 1940, of which the present applicant is the sole owner.

It is an object of this invention to provide an improved coiled wire filtering element to filter the brewed coffee while it is being drawn downwardly by suction from an upper to a lower receptacle.

Another object of the invention is to provide a filtering coil which is easier to clean in a thorough manner, and which may be so cleaned without removing it from the filtering position, and without an objectionable forcing farther apart the coils thereof by traction, or otherwise.

Still other objects are to simplify the filtering means, reducing the same to the minimum number of parts, namely, unity; to provide improved means for holding the filtering element in its operative position; to provide a filtering coil which can be more quickly and conveniently manually removed from the filtering position and which, by reason of its lightness and resiliency minimizes danger of breaking the wall of any glass container which it happens to strike against; and to provide a coiled filtering element which can be more quickly and conveniently placed in its operative position, no crowding or wedging thereof into place being required.

Other objects, advantages and features of invention will hereinafter appear.

Referring to the accompanying drawing, which illustrates what is at present deemed to be a preferred embodiment of the invention, Fig. 1 is a vertical mid-section of the casing of the device, the filter element being shown therein as it appears from all sides.

Fig. 2 is a plan of the filter element, per se, as viewed from line 2—2 of Fig. 1, on an enlarged scale.

Fig. 3 is an elevation of a modification of the filter element per se.

Referring in detail to the drawing, the lower receptacle 5 supports an upper receptacle 6 of a coffee maker having a downwardly extending funnel-like spout 7 integral therewith, there being an annular rubber gasket 8 fitted within the mouth of said lower receptacle, these parts, separately considered, not being novel.

The novel filter element provided by this invention consists of a single piece of plain wire which is formed into an approximately tubular coil, said coil having a slightly tapered body portion 9 with an open lower end and furnished with a more steeply coiled conical upper end portion 10 wherein the coils progressively decrease in diameter until they reach the produced axis of the body portion of the coil, thus closing the upper end of the coiled structure except for the presence of a slight clearance between adjacent coils.

This novel resilient filtering coil is made of stainless steel spring wire, which insures that the coils thereof accurately maintain themselves in their relative positions, the coil being manufactured in such a manner that adjacent coils, throughout the entire length of the spring, maintain themselves slightly spaced apart, thereby providing a narrow, helical, strainer slit 11 which extends from end to end of the spring. Said slit not only serves to strain out the granules from the brewed coffee, but it also aids the user quickly and thoroughly to clean the filter after use for it admits the cleaning liquid between adjacent convolutions at all times without lengthwise tractioning of the coil.

The upper, steeply conical end portion 10 of the coil is closed (except for the presence of the strainer slit 11) by a progressive decrease in the diameters of its convolutions, which decrease in coil diameter is continued to the axis of the coil as a whole.

In Fig. 3 is shown another embodiment of the filtering coil wherein the body portion 9a of the coil is shaped the same as the coil 9 but the wire strand of the coil is extended at its upper end to form a hook-shaped extension 14 under which may be inserted a finger of the operator in order to apply upward traction to the coil in order to withdraw it from the spout 7 of the open-topped upper container 6 when the helical portion of the spring is positioned vertically with its open end directed downwardly, the center of gravity of said hook-shaped extension being in alinement with the axis of said coil and spout.

In both embodiments of the invention the resiliency of the coil can be depended upon to hold it in its operative position in a dependable manner when the coil is inserted in place within the spout 7 with the smaller end of the long, gradual, taper directed downwardly. Also, in both embodiments, a closing of the upper end of the coil (except for the presence of the strainer slit 11), is effected by progressively decreasing the diameters of the convolutions in such a manner as has already been described.

The operation of the device will be readily understood from the foregoing description of the invention, supplemented by the knowledge of those skilled in the art to which the invention pertains.

It should be understood that the present disclosure is for the purpose of illustration only and that this invention includes all modifications and equivalents which fall within the scope of the subject matter claimed.

What is claimed is:

1. As an article of manufacture, a filter for insertion into the downwardly directed spout of a coffee maker receptacle, said filter consisting of a helical wire spring the convolutions of which are of such tensility as to maintain themselves normally upright without auxiliary support in a uniformly slightly spaced apart relation from end to end of the helix, thereby providing a continuous coffee filtering slit while obstructing the passage of coffee grounds, said helical spring being open at one end and at its opposite end being closed against the passage of coffee grounds, by reason of its coils progressively decreasing in diameter and terminating at the axis of the coil as a whole.

2. As an article of manufacture, a filter element for insertion into the downwardly directed spout portion of a strainer receptacle, said filter element consisting of a helical wire spring the convolutions of which maintain themselves normally in a uniformly slightly spaced apart relation to each other thereby providing a filtering slit, said helical spring being open at one end and at its opposite end being closed except for said filtering slit, by reason of its coils progressively decreasing in diameter to the axis of the coil as a whole, the wire strand at the closed end being extended from the axis of the coil in relation to the coil as a whole and formed into a hook to receive a finger of the operator, when the helical portion of the spring is positioned vertically with its open end directed downwardly, the center of gravity of said hook being in alinement with the axis of said coil and spout.

3. A filter for insertion into the downwardly directed spout portion of a coffee maker, said filter consisting of a helical wire spring the convolutions of which are of such tensility as to maintain themselves normally upright without auxiliary support in a uniformly slightly spaced apart relation to each other from end to end of the helix thereby providing a continuous coffee filtering slit while obstructing the passage of coffee grounds when vertically poised in filtering position in the mount of the funnel-like spout of a conventional coffee maker of the pressure vacuum type, said helical spring being open at one end and at its opposite end being closed except for said filtering slit, by reason of its coils progressively decreasing in diameter to the axis of the coil as a whole.

4. A filter for a coffee maker consisting of a single piece of plain wire formed into an approximately tubular coil, said coil having a slightly tapered body portion with an open lower end and furnished with a more steeply coiled conical end portion wherein the coils progressively decrease in diameter until they reach the produced axis of the body portion of the coil as a whole, thereby closing the upper end of the coiled structure except for the presence of a slight clearance between adjacent coils, said coil being constructed in such a manner that adjacent coils throughout the entire length of the spring maintain themselves normally uniformly slightly spaced apart without auxiliary support in a vertical relation to the axis of the coil as a whole and with sufficient tensility to support the helical construction against lateral distortion and axial collapse due to the weight of superimposed coils, thereby providing a narrow, helical strainer slit which extends from end to end of the spring wire comprising the coil, said slit not only serving to strain out the granules from the brewed coffee, but also aiding the user quickly and thoroughly to clean the filter after use without lengthwise tractioning of the coil.

FRANK J. BURNHAM.